Figure 1:
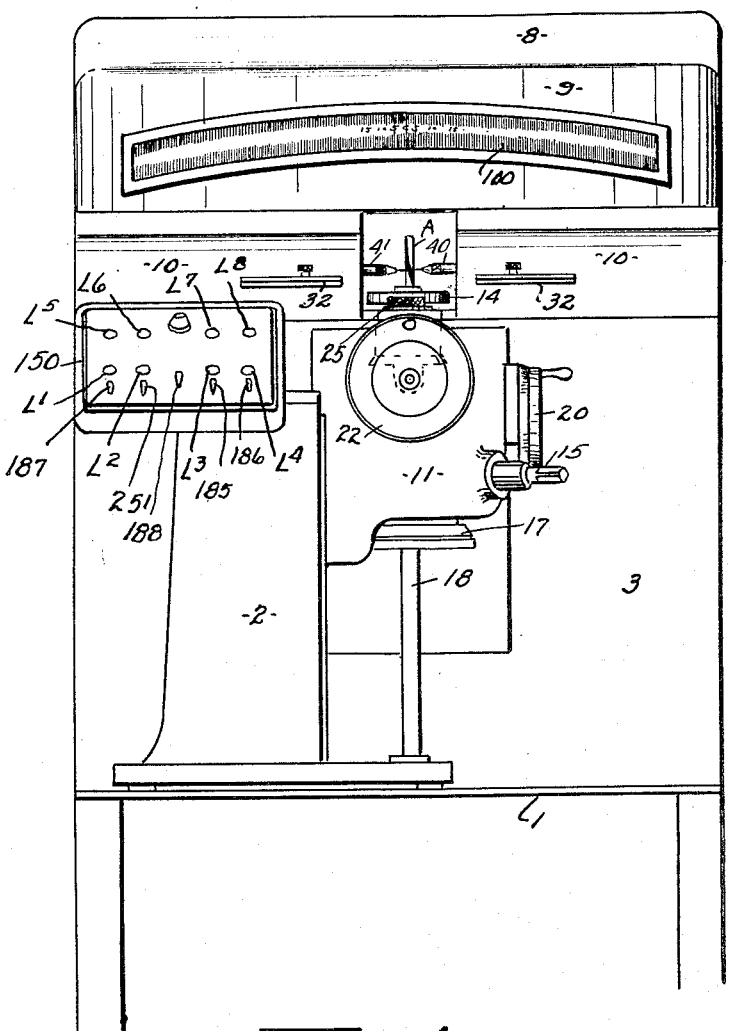

March 8, 1955   J. H. BREISCH   2,703,457
MEASURING MACHINE

Filed Oct. 16, 1948   7 Sheets-Sheet 1

INVENTOR.
JOHN H. BREISCH

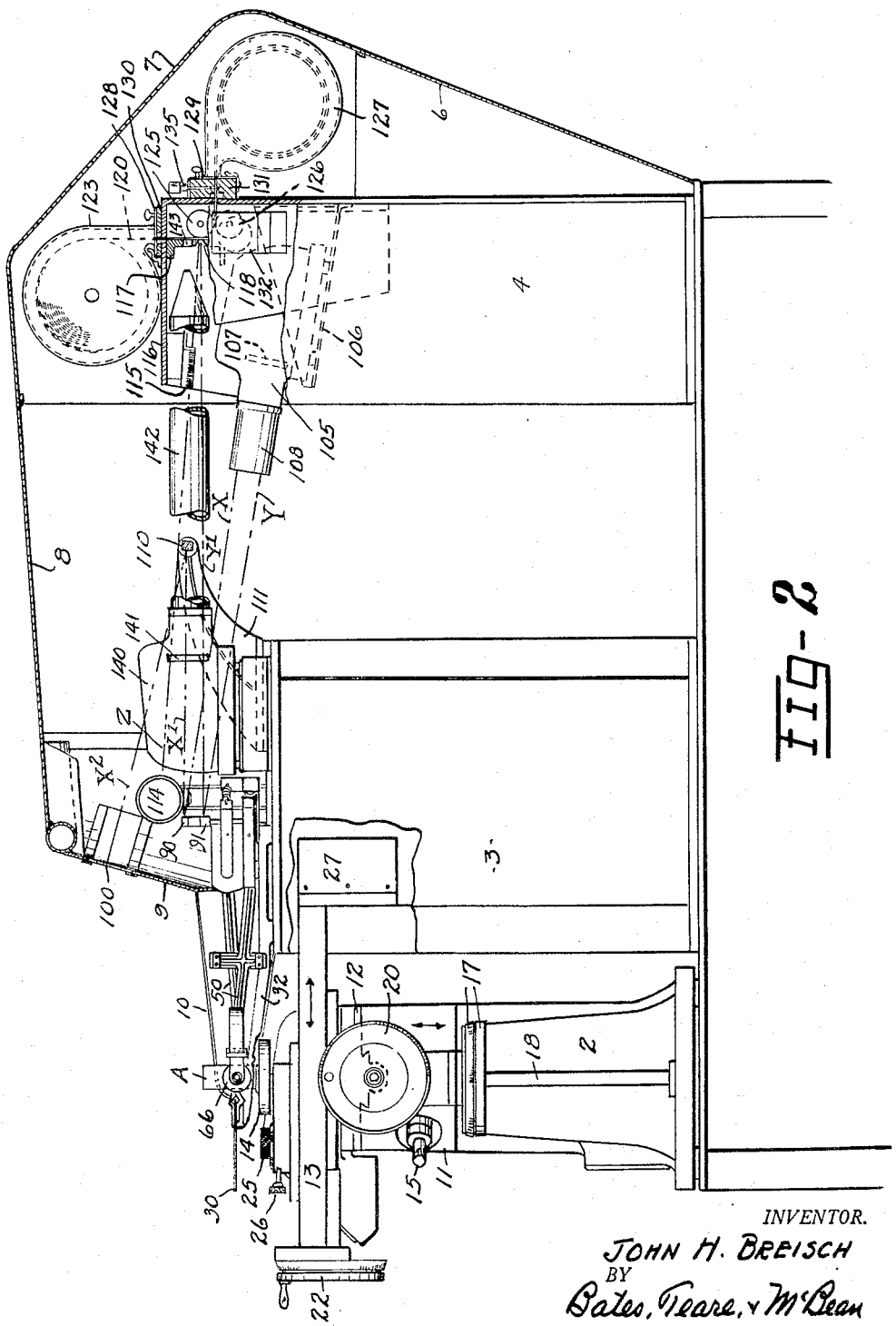

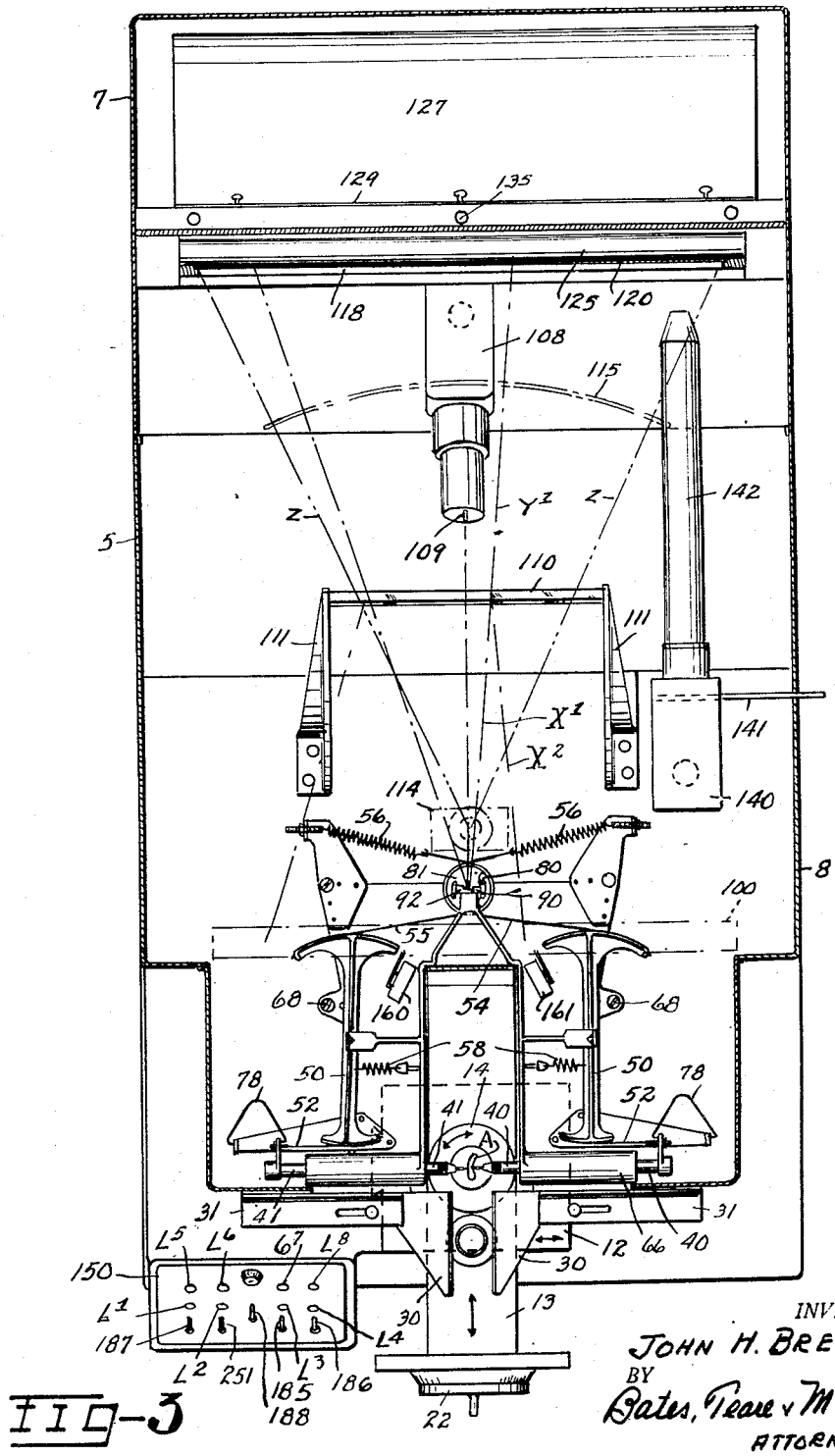

March 8, 1955  J. H. BREISCH  2,703,457
MEASURING MACHINE
Filed Oct. 16, 1948  7 Sheets-Sheet 4
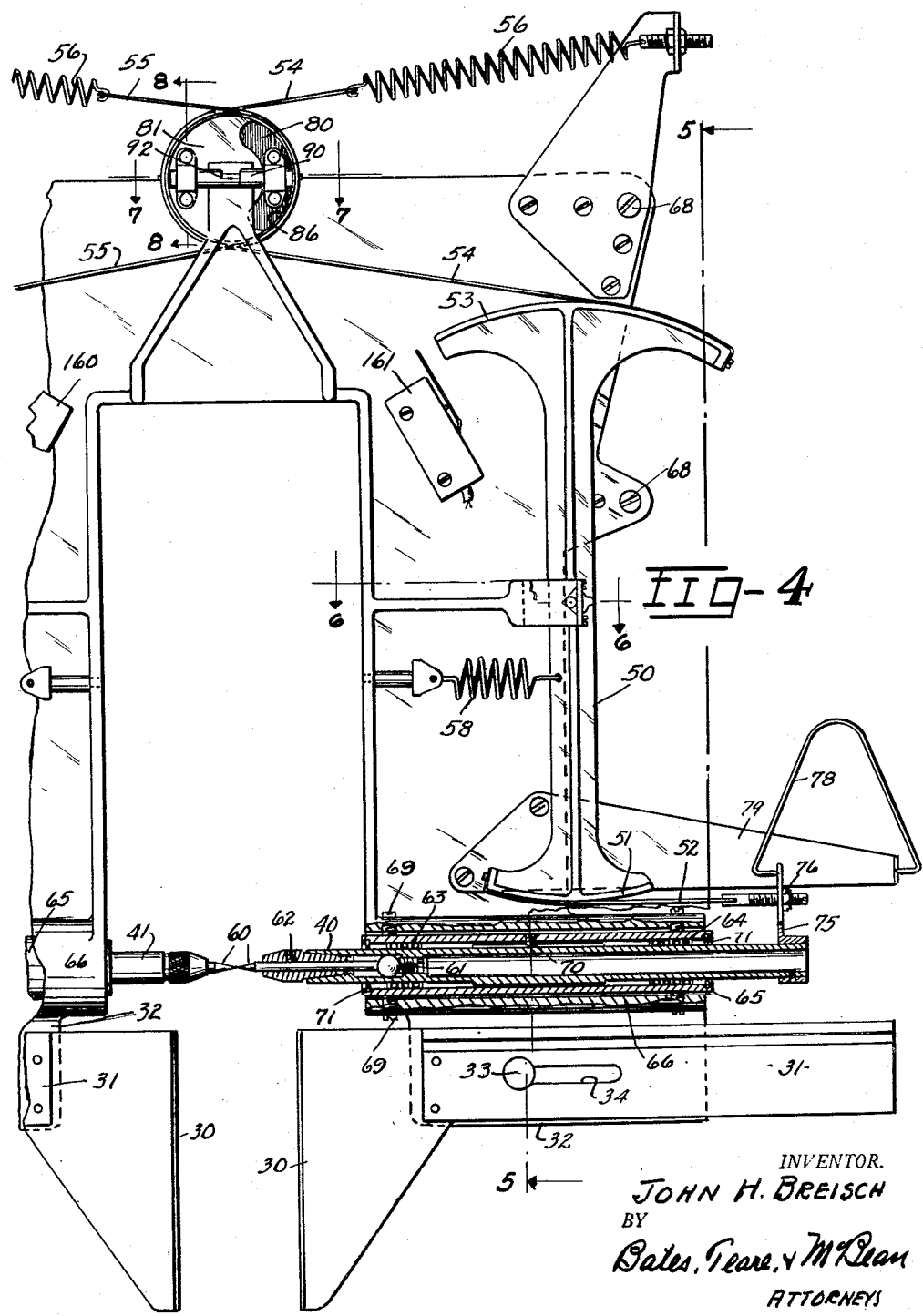
INVENTOR.
JOHN H. BREISCH
BY
Bates, Teare, & McKean
ATTORNEYS March 8, 1955  J. H. BREISCH  2,703,457
MEASURING MACHINE
Filed Oct. 16, 1948  7 Sheets-Sheet 5
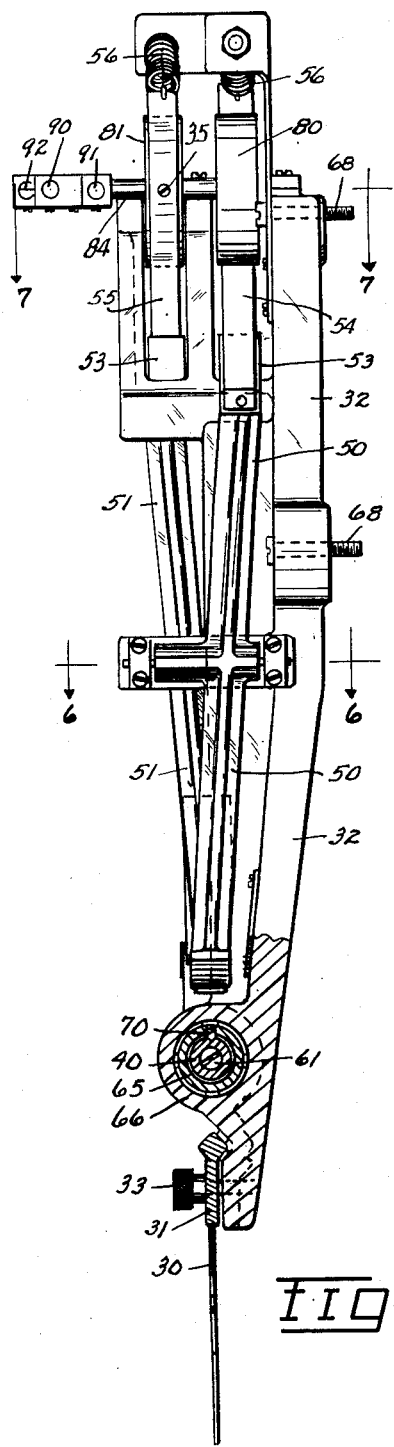
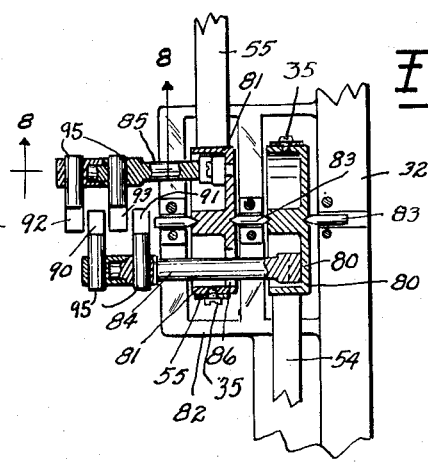
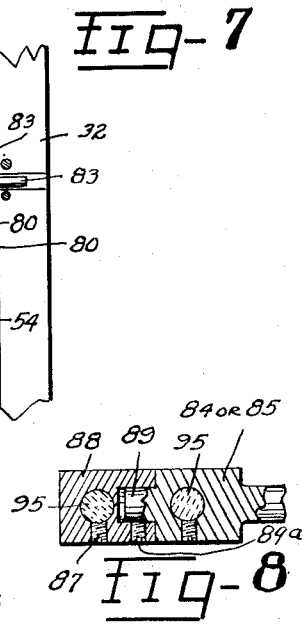
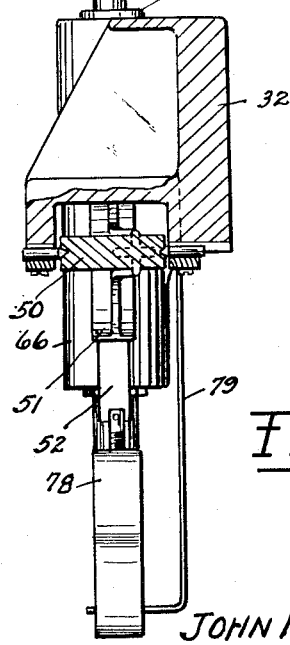
INVENTOR.
JOHN H. BREISCH
BY
Bates, Teare, McKee
ATTORNEYS March 8, 1955 J. H. BREISCH 2,703,457
MEASURING MACHINE
Filed Oct. 16, 1948 7 Sheets-Sheet 6
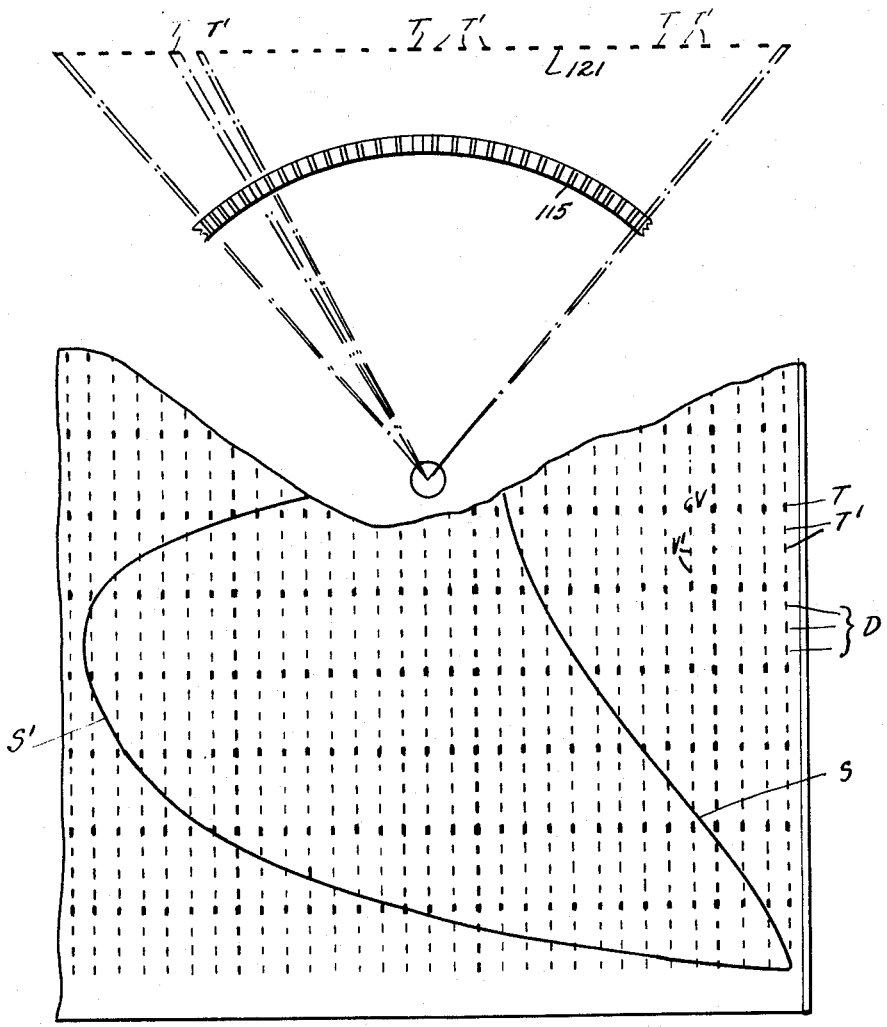

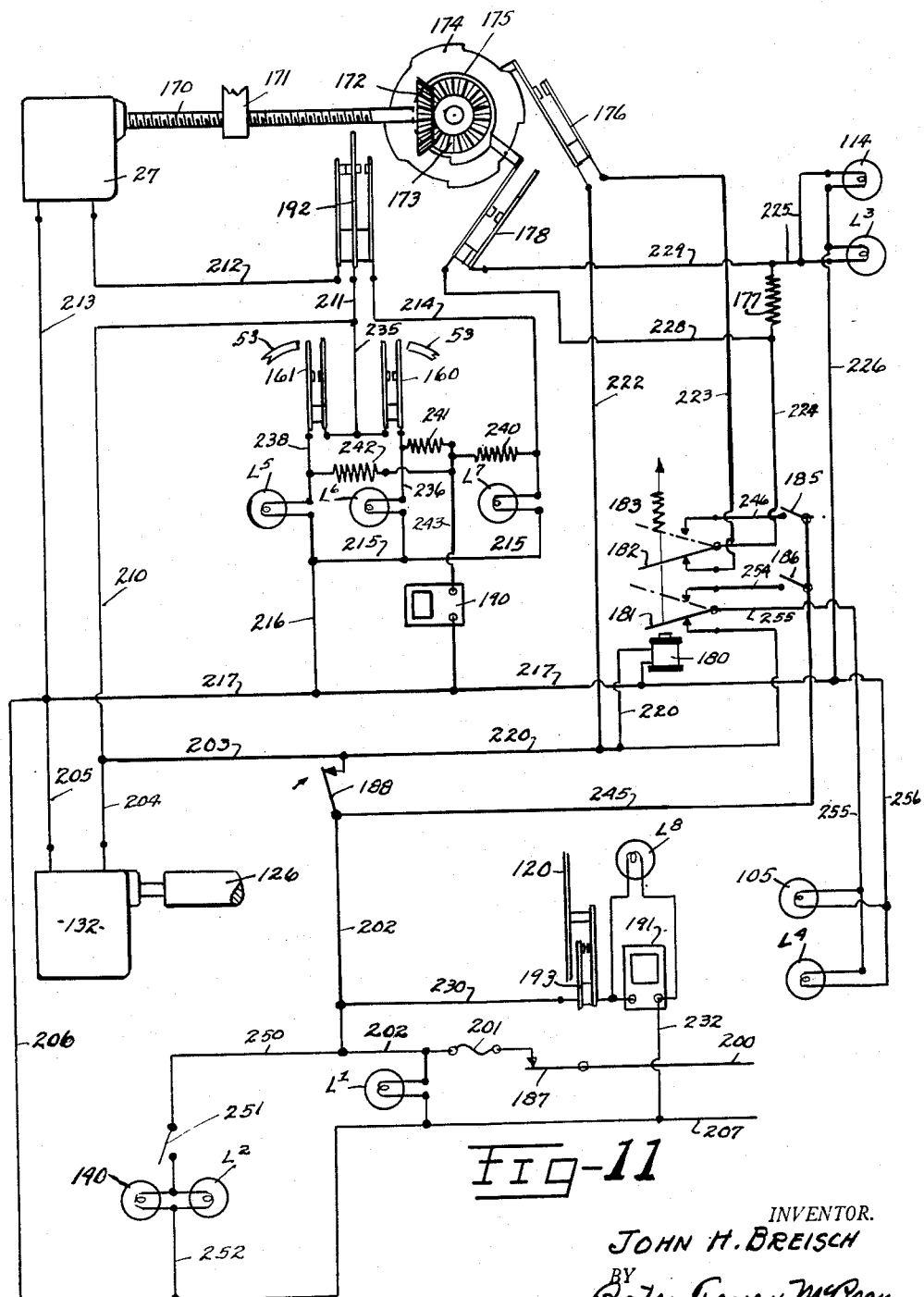

United States Patent Office 2,703,457
Patented Mar. 8, 1955

2,703,457

MEASURING MACHINE

John H. Breisch, Lakewood, Ohio, assignor to Measuring Machines, Inc., Cleveland, Ohio, a corporation of Ohio Application October 16, 1948, Serial No. 55,005

11 Claims. (Cl. 33—174)

This invention relates to a machine for making, displaying and recording profile measurements. The measurements are made by the employment of a feeler to engage the surface of the article to be measured and a mirror controlled by the movements of the feeler to direct a beam of light, either onto a visual screen or a photographic film or both, to produce a greatly magnified image. The machine further provides two opposed feelers and two mirrors operated respectively by the feelers so that simultaneous measurements may be taken on opposite faces of an article and show the relative profiles of the two faces. Means are provided for gradually moving the article to cause the feelers to trace a succession of measurements across the article, and there are also means for shifting the article transversely of such measuring path to enable measurements in adjacent paths. The machine provides means for moving the photographic film to present the successive paths of measurement on successive film-locations and also to make other, definite spaced, indications thereon to constitute eventually a chart showing the actual measurement of the profile or profiles indicated by the feeling mechanism.

It is an object of the present invention to devise a machine for carrying out the above-mentioned objects which shall be self-contained, and which will operate efficiently under various conditions of use.

Another object is to provide a visual indicator in a position which may be readily observed by the operator at the machine as the measurements progress.

Various other features contributing to the efficiency of the machine are also included within my invention, as will be apparent from the following description of the machine shown in the drawings and from the appended claims.

Briefly stated, this machine employs an axially movable feeler rod to engage the article to be measured, a mirror carrier adapted to be turned about an axis, an intermediately pivoted member having convex portions on opposite sides of its pivot, and flexible straps connecting the feeler rod with one of such convex portions and connecting the mirror carrier with the other convex portion. I provide a source of illumination directing light toward the mirror, which reflects it onto a visual screen for immediate observation by the operator and also onto a photographic film to make a permanent record. I provide also a second source of illumination, light from which may pass through a comb to produce a chart of fixed measurement on the screen. As both the article and the screen move in definite relation during the operation, the measurement mirror may operate to trace on the photographic film a line which in association with the produced chart of fixed dimensions provides a record of the form and measurement to the contour of the article, all greatly magnified from the actual dimensions of the article.

In the drawings, which show a preferred embodiment of my invention, Fig. 1 is a front view of the machine; Fig. 2 is a sectional side elevation thereof; Fig. 3 is a plan of the machine with the cover in section; Fig. 4 is a sectional plan on a larger scale than Fig. 3, showing especially the operating parts from the feeler to the mirror; Fig. 5 is a vertical longitudinal section in the plane indicated by the offset line 5—5 in Fig. 4; Fig. 6 is a vertical transverse section in the plane indicated by the line 6—6 on Figs. 4 and 5; Fig. 7 is a view in vertical section through the mirror carriers, the plane being indicated by the line 7—7 on Figs. 4 and 5; Fig. 8 is a detail of the mirror carrier being a section on the line 8—8 on Figs. 4 and 7; Fig. 9 is a diagrammatic plan in the nature of a horizontal section through a light-interrupting comb shown in Fig. 2; Fig. 10 is a face view of a portion of a record chart such as may be produced by the machine; Fig. 11 is a wiring diagram for the various electrically controlled parts.

Referring first to Figs. 1 and 2, I provide a base frame indicated conventionally at 1 and three upstanding frames 2, 3 and 4, mounted on top of the base frame and all covered by a suitable hollow downwardly facing casing. This casing is composed of vertical side members 5, rear members 6 and 7, the latter extending over onto the top and being removable, and a top member 8 and 9. The portion 9 inclines downwardly at the front and carries the visual screen designated 100 and hereinafter more fully described. From the bottom of the cover portion 9, two cover portions 10, spaced apart to disclose the object A to be measured, extend forwardly and then downwardly.

The frame member 2 which is at the front of the machine as the operator faces the visual screen carries the object to be measured A by suitable intermediate supports which allow the adjustment of the object in any direction. As shown the frame 2 has mounted thereon a vertical removable slide 11. On this slide is a transversely movable slide 12 and on the latter slide is a longitudinally movable slide 13. The slide 13 carries a tray for a rotatable table 14 on which the object A is clamped. This allows the object to be adjusted up and down laterally and in and out and also turned on a vertical axis as may be desired to position it.

Suitable means as a screw and nut (not shown) is provided for raising the slide 11. I have indicated some means by the projecting square end 15 of an operating shaft which may receive a suitable handle wrench. I also provide a vernier for the vertical adjustment indicated by the two discs 17 carried by the slide 11 and slidable on the vertical post 18, one of these discs being rotatable with reference to the other and causing a slight vertical movement for the slide.

20 indicates a hand wheel which may operate a screw 21 for shifting the slide 12 laterally. 22 indicates a hand wheel which may operate a screw (not shown) for shifting the slide 13 longitudinally. The turntable 14 may be rotated about any suitable mechanism, operated for instance by the thumb screw 25 and clamped by the set screw 26.

The above described parts may all be hand operated to set the article A in the described original portion for measurement or for subsequent movement, if desired. In addition, the slide 13 is provided with suitable motor-operated mechanism to gradually move it as the measurement progresses to effect automatically successive measurements in a straight path across the article. Fig. 2 indicates at 27 a housing for a motor to effect this operation. This motor is of the constant speed type, as, for instance, an A. C. synchronous motor.

The operator is supposed to occupy a position directly in front of Fig. 1, which is at the left hand end of Fig. 2, where he can readily operate all the various positioning members and may also readily observe the visual screen 100 carried by the inclined front of the casing.

It is desirable to locate the article being measured in a certain definite position with reference to the travel of the table 13 and as guides for such positioning I may provide a pair of indicating blades 30 which have adjacent edges parallel with the line of movement of the table and having shank portions 31 adjustably clamped to the forward end of the bracket 32 mounted on top of the frame 3. The clamping is effected by screw 33 (Fig. 4) passing through a slot 34 in such shank into the bracket. The article if curved (like a turbine blade for instance) is clamped on the turntable with its chord aligning with the edge of one of the guides 30, and hence the subsequent longitudinal movement of the article is along a path parallel with such chord.

The mechanism to engage the object and operate mirrors to reflect the light correspondingly is carried by the vertical frame 3 and is shown in Figs. 2 to 8 inclusive. This mechanism, as shown in Fig. 3, is preferably in duplicate to engage opposite sides of the article A and furnish at once a measurement of each side. As shown, there are two axially movable feelers 40 and 41 adapted to operate, by mechanism to be described two surmounting mirror carriers 80 and 81 respectively. However, as the mechanism on each side as shown in Fig. 3 is a practical duplicate of that on the other side (except that they differ as rights and lefts) only one side will be described, it being understood that a corresponding description would apply to the other side. As Fig. 4 shows in detail the mechanism in the right hand side, I will continue with a description particularly of that mechanism.

Mounted on each frame bracket 32 is a centrally pivoted rocking member 50. This rocking member has a convex heel 51 at its forward end about which extends a flexible strap 52 connected at one end to the rocking member and at the other end to the axially movable feeler bar 40. At its other end each rocking member has a convex head 53 over which extends a strap 54 or 55 anchored at one end to the head 53 and thence passing around and anchored to the respective drum 80 or 81 and after leaving the drum is attached to a tension spring 56 anchored at its other end to the frame. Each strap is anchored as by a screw 35, adjacent its mid-portion, to the associated drum, so as to prevent slippage between the strap and drum. This maintains the strap taut about the drums each for substantially a semi-circle.

A tension spring 58, materially stronger than the spring 56, is provided anchored to the forward portion of the rocking member and of the frame and operating to maintain the feeler against the object. It follows from the above described mechanism that as the feeler moves in or out, that is to the right or left of Fig. 4, according to the contour of the object, the mirror is correspondingly turned. This mirror by means hereinafter described operates to throw a light indication on the visual screen 100, which is a translucent sheet carrying definitely spaced visible indicating marks, and also on the photographic film of the rear portion of the machine carried by the frame 4.

As is shown more particularly in Figs. 4 and 5, the feeler comprises a hollow tube 40 carrying within it a pointed rod 60 shown as adjusted by a screw 61 within the tube and clamped by a set screw 62. The hollow tube is mounted within two sets of rollers 63 and 64 which are within a second hollow tube 65 which is carried within a hollow sleeve portion 66 of the bracket 32 secured as by screws 68, Fig. 5, to the top of the frame 3.

The barrel 65 may be accurately adjusted within the housing 66 by suitable positioning screws 69. This barrel carries a set screw 70 projected into a longitudinal groove in the tubular rod 40 so as to prevent rotation of that rod. The rod, however, may readily shift in and out within its rolling annular bearings. The balls comprising such bearing are retained within the tube 65 by suitable end retainers 71 and other means, if desired.

The feeler tube 40 or 41 is provided at its extreme end with an arm 75 to which the strap 52 is adjustably attached as by means of the screw and nut 76. A U-shaped leaf spring 78 tending to contract its ends engages the arm 75 and a bracket 79 secured to the frame 3 and thus maintains the strap 52 taut at all times. It results from the construction described that the pointed feeler rod 40 or 41 when positioned against the object may readily shift in or out according to the contour of the object being measured and such shifting causes a corresponding rotary movement of the corresponding drum 80 or 81 which turns the mirror or mirrors helds by that drum. As subsequently described, the mirrors reflect light from a fixed source onto the screen 100 for visual observation and onto a photographic film carried near the rear of the machine for permanent record.

In the present embodiment, the two drums 80 and 81 are mounted on the same vertical axis. Fig. 7 shows these two drums mounted in open spaces in a supportng standard 82 carried by the frame 3, this standard carrying three stationary arbors 83 in vertical alignment on which the drums are accurately mounted. Each drum carries a pair of mirrors, for reasons hereinafter described, each pair being mounted on a rod 84 or 85 secured to the respective drum, the rod 84 extending through an arcuate slot 86 in the drum 81.

The rod 84 carries two mirrors designated 90, 91 one located vertically above the other. Similarly the rod 85 carriers two mirrors 92 and 93, one above the other and offset from the mirrors 90 and 91, as shown in Fig. 7. This brings four mirrors normally in vertical alignment with alternate ones operated by the measuring feelers on opposite sides of the object. The two upper mirrors are utilized for dircting the rays for the visual indication and the two lower ones for the permanent record, as hereinafter described.

As shown each of the mirrors comprises a piece of glass having a cylindrical shank 95 and a flattened portion plated or polished to form a reflecting surface. The shanks occupied cylindrical holes in the respective carrying rods and are locked in adjusted position by set screws 87, Fig. 8.

To enable accurate adjustment of one of the mirrors carried by either rod with reference to its neighbor on that rod I mount the lowermost mirrors 91 and 93 directly in integral heads on the respective rods while I mount the other two mirrors 90 and 92 each in an adjustable extension 88 swivelly carried by a stud portion 89 of the head on the rod and locked thereon by a set screw 89a (Fig. 8).

It will be understood from the description heretofore given that as the article being measured is moved in a longitudinal horizontal direction, the points of the feeler rods trailing along the article surface in paths opposite each other will effect a corresponding swinging of the mirrors and hence the position of rays of light reflected by those mirrows will indicate the opposite contours of the article.

The source of light to be reflected by the mirrors, and the photographic screen and its operating mechanism, are carried by the rear vertical frame 4. As shown in Fig. 2, this frame carries a lamp housing 105 shown as resting on a bracket 106. The lamp in this housing emits light through suitable lens 107 along a projecting barrel 108 and thence through a narrow slit 109 (Fig. 3) to strike against the mirrors. As indicated in Fig. 2, the upper portion X of the light rays striking the upper mirrors 90 and 92 are reflected rearwardly along the line $X^1$ against a transverse mirror 110 (carried by brackets 111 secured to the frame 3) and thence passes as indicated at $X^2$ to the visual screen 100. On the other hand, the lower portion of the rays of light indicated at Y passing from the barrel 108 strikes the lower mirrors 91 and 93 and is reflected rearwardly along the line $Y^1$ to act on the photographic film.

As the object is moving continually rearwardly during the measuring operation, the rays of light reflected by the mirrors onto the film shift horizontally as the feeler moves. The film at this time is continuously moving in a vertical direction. The result is that the image produced on the film forms a continuous line indicating in greatly magnified form the contour of the article in the region measured.

Fig. 10 given an illustration of two contour lines S and $S^1$ photographically produced on the chart and corresponding in magnified form to the contours of the opposite faces of the object in the region measured. Such contour lines of themselves on a blank sheet would be a useful record. However, it is desirable to superimpose such lines on a chart having indications equally spaced from each other so that the actual measurement of the contour lines photographically produced may be read from the chart, and it is important to produce the chart at the same time as the production of the contour lines to insure accuracy. The means by which the machine produces such a chart, illustrated in Fig. 10, will now be described.

Suitably mounted on the frame 3 adjacent the mirrors is a separate source of light 114, Figs. 2 and 3. The rays from this light pass first through an arcuate comb substantially concentric of the lamp 114 and shown as supported by the top plate 116 of the hollow frame 4. The rays thence pass to the photographic film indicated at 120. The comb operates to interrupt the horizontal continuity of the rays so that they form spaced images in a horizontal line on the film, as indicated at 121 in Fig. 9. As the film is continuously moving in a downward direction (as hereinafter more fully explained) these images become short vertical dashes and thus produce the peculiar chart shown in Fig. 10.

In the photographically produced chart all of the images or dashes in a transverse row (Fig. 10) are equally spaced according to the spacing of the comb 115, and each space from dash to dash in the horizontal row corresponds to a given movement of the feeler point. The actual spaces on the chart are of course very much greater than the actual movement of the feeler point. The vertical space between images on the chart is dependent on the rate of movement of the film, and, as this movement corresponds to the horizontal movement of the article being measured, the vertical spaces are a definite multiple of the article movement. A more specific explanation of the particular chart shown in Fig. 10 will be given later.

Within the frame 4 at the rear of the comb 115 is a cross bar 117 having a horizontal slit 118. The film 120 lies close behind this horizontal slit. The top plate 116 of the frame carries a housing 123 for a wide roll of film 120, and this film extends from the roll downwardly along the rear face of the bar 117 and thence turns rearwardly between a pair of coacting continuously rotating rollers 125 and 126 and passes into a receiving housing 127. The two housings 123 and 127 are carried respectively by base bars 128 and 129 which are removably clamped to flat bars 130 and 131 fixed to the top and rear of the frame 4.

Suitable mechanism, including a constant spaced motor (an A. C. synchronous motor for instance) in the housing 132, Fig. 2 and hereinafter referred to in connection with the electric diagram, is provided to rotate the feed rolls 125 and 126 continuously to feed the film downward and rearwardly to bring a fresh portion thereof behind the opening 118 for action by the light from the mirrors 91 and 93.

Thus the film from the reel 20 is exposed to light through the slit 118, thence passes to the housing 127, where it winds itself into a roll around the inner surface of the housing, after which that housing is removed and the exposed film developed in the usual manner.

It will be seen that my means of the removable film housing and the removable rear member 7 of the casing the housing containing a fresh film may be installed whenever desired and the housing containing the exposed film may be removed whenever desired to develop the film.

The removal of the exposed film may take place after the entire film has been exposed and curled up in the receiving housing 127. However, means is provided for severing the exposed film so that it may be delivered into the receiving housing in the form of separated charts, allowing immediate development of any chart. The severing means shown comprises a vertically movable knife 135 mounted in the fixed bar 131 secured to the rear of the frame 4.

It is frequently desirable to print some identifying designation or legend on the photographically produced chart. For that purpose, there is provided a separate projection lamp in a housing 140, Fig. 3, throwing its rays horizontally rearward through a transparent slide 141 and thence along a barrel 142 to act in the film through a special opening 143 (Fig. 2).

It will be noticed from an inspection of the chart, Fig. 10, that every fourth dash in a vertical row such as V is extra heavy, and that every tenth dash as at T in each horizontal row is heavier than the other dashes $T^1$ in the same horizontal row. These periodic extra heavy marks are for the convenience of counting the spaces on the produced chart.

The extra heavy marks T in the horizontal rows are made by wider spaces in the comb 115. On the other hand, the extra heavy marks in the up-and-down direction V are made by intensifying the light in those regions. This is accomplished by providing a resistance, normally in series with the light which is in circuit three times out of four but is short circuited on the fourth image. Literally this results in a blacker image on the fourth impression and a grayer image on the other three images in that vertical row, but this is indicated in the chart by a wider image V in contradistinction to the narrower image $V^1$.

As the length of the dashes, and the length of the spaces therebetween, depends upon the length of time the chart-printing light is on and off, and as the control for this light is definitely geared with the movement of the article-carrying table, it follows that each successive horizontal row of dashes corresponds to a different region of the feeler engagement with the article, and as the speed of movement of the chart may be great in comparison to that of the table a small change in the shifting of the measuring points results in a readily visible change in the location of the corresponding portion of the contour line being formed on the chart. In the embodiment shown the ratio of the speed of these movements is four to one.

Likewise, by counting the number of dashes between corresponding points on the two contour lines on the chart, for opposite sides of the article, one may readily obtain the actual distance across an article at that region. For example, if the distance from the center of one dash to the center of the next in a horizontal row represents 0.002 inch of movement of the feeler, then, if there are fifteen dashes with their spaces between corresponding points on the contour lines, I know the actual cross sectional dimension of the article at that location is 0.030 inch.

I provide the machine with an instrument board shown at 150 located at the left of the operator as he faces the machine. This instrument board is shown as provided with five switches and eight telltale small lamps. The five switches effect the following controls: First, the main switch to turn on the power; second, a switch to establish the circuits for automatic control; third, a switch to establish non-continuous manual control of measurement of the article; fourth, a switch to establish manual control for continuous operation; fifth, a switch to turn on the light for the legend-projecting device for marking the chart.

The eight telltale lamps as shown indicate various conditions of the apparatus. Their relative location is immaterial but I will designate them as "first" to "eighth." First lamp shows, by its illumination or otherwise whether the power switch is closed or open; second lamp indicates whether the light for the legend projector is on; the third lamp indicates if the scale producing light is on or off; the fourth lamp indicates if the measuring light is on or off; fifth lamp indicates if the film is properly operating, such indication showing if the film has run out; sixth lamp indicates that the table has traveled to its limit; the seventh indicates that the measuring images produced controlled by the feelers are beyond the left hand edge of the chart; and the eighth that such images are beyond the right hand edge of the chart.

I also prefer to provide a buzzer associated with the sixth, seventh and eighth lights to call attention to the fact that the table has reached its limit or that the indication is off of the chart, and another buzzer of a different tone is provided associated with the light for the film operation to call attention to the fact that the film has run out.

The switches for controlling the seventh and eighth telltale lights to illuminate such lights when the indication is too far to the right or the left are positioned to be operated automatically by the swing levers 50. Thus there is shown in Fig. 3 a switch 160 adapted to be closed by an extreme movement of the right hand lever 50 and a switch 161 adapted to be closed by an extreme movement of the left hand lever. By means of these two switches and their indications I can be sure that the rays to produce the image will strike the chart.

Referring now to the wiring diagram (Fig. 11) 27 indicates the table drive motor shown as operating a screw 170 which is engaged by a suitable portion 171 of the table. This screw is shown also as provided with a bevel gear at 172 operating meshing gear 173 which rotates a pair of cams 174 and 175. The cam 174 has four bulges to give four intermittent closures of the switch 176 which controls the illumination of the chart-printing lamp. The cam 175 operates to close a switch 178 which cuts out resistance 177 once every fourth time to intensify the scale printing light. 132 in the diagram indicates the motor which drives the feed roll 126 and, through it by friction through the film, the cooperating freely rotating feed roll 125.

The diagram shows at 180 a solenoid which when energized by the closing of a manually operable control switch 188 moves two connecting switches 181 and 182 to the position shown in Fig. 11 against the action of the spring 183. When in the position shown, two manually operable switches 185 and 186 are open. The main power switch is indicated at 187.

The buzzer for the controls with reference to the margin of the sheet is shown at 190 and the buzzer for the paper control at 191. The measuring light is indicated at 105 and the scale producing light at 114 in this diagram and the legend projector light at 140.

In the wiring diagram the eight indicator lamps are designated by the letter L with an exponent corresponding to the list of such lights heretofore given. The diagram also indicates at 192 the table-limit switch to be engaged by the part of a table and changed from closing one circuit to opening it and closing another at the limit of movement; it also shows a switch 193 normally held open by the film 120 but automatically closed when the film runs out.

The wiring diagram shown is designed for an A. C. current, preferably of 110 volts. Such circuit may be traced from a source via the line 200 through the power switch 187 and a suitable fuse 201 to a line 202 through the control switch 188 through a line 203. This line divides and one branch passes by a line 204 through the film drive motor 132 thence to a line 205 to a line 206 to a line 207 to the other terminal at the source.

Coupled in parallel with the paper drive motor 132 is the table drive motor 27, the circuits being shown as passing from the junctions of the lines 203 and 204 by a line 210 to a line 211 through the limit switch 192 to a line 212 through the motor 27 and back by the line 213 to the junction of the lines 205 and 206. From the normally open terminal of the limit switch the line 214 passes through the telltale light $L^7$ to the line 215, thence to the line 216 to the return line 206.

A line 220 passes from the control switch 188 through the solenoid or relay 180, and back to the return line 217. The relay controlled by this solenoid normally is in the dotted line position shown in Fig. 11. In such position the measuring and scale lamps 105 and 114 are under control of the manually operable switches 185 and 186 respectively. When the relay 180 is energized the contact members thereof are in the position shown in full lines in Fig. 11 and the circuit between the switches 185 and 186 and their respective lamps is broken and the lamp 114 is placed under control of the table drive motor 27 and thereby is automatically operated in timed relation with the movement of the table. At such time the lamp 105 is constantly on.

The scale light switch 176 is connected with the line 220 by a line 222, and by line 223 to the switch 182 and thence in the automatic operation of the circuit to a line 224, usually through the resistance 177, to the line 225 and thence through the scale lamp, and its telltale lamp in parallel therewith, to the line 226 and back to the return line 217. Lines 228 and 229 enable the switch 178 to short circuit the resistance 177.

A line 230 leads from the line 202 to the film switch 193. This switch is normally open but when closed by the absence of film the circuit continues through the film light $L^8$, and the buzzer 191 in parallel therewith, to a line 232 back to the return line 207.

The two switches 160 and 161, for properly positioning the image on the chart, are normally open. The line 235, which connected with the line 211, leads to each of these switches, and, from the other member of the switch 160, a line 236 leads through its telltale light to the line 215, thence to the line 216 and back to the return line 217. From the switch 161 a line 238 leads through its telltale light to the line 216. The lines 214, 236 and 238 are all connected by branch lines leading through the respective resistance 240, 241 and 242 to a line 243 passing through the buzzer 190 to the return line 217. The purpose of the resistances is to permit operation of the buzzer 190 upon energization of any one of lines 214, 236 or 238 without illuminating the lamps in the other two lines.

In addition to the automatic operation by the circuits described, the two switches 185, 186 in the diagram and the circuits controlled thereby allow the manual operation heretofore described for measuring an object and indicating it either on the visual screen which is a transparent member with a sub-divided scale thereon or on the film to print indications of the position of the two feeler points or to have both the visual screen and the film illuminated. During such operation, the motors are idle, but if desired, the table may be operated manually in which case the straight horizontal line would be formed photographically on the film if the film light were on. The switch 185 controls the scale light and the switch 186 the measuring light.

The manual opening of the control switch 188 causes the solenoid 180 to lose its magnetism so that the switches 181 and 182 are swung by their spring 183 into the position indicated by broken lines in the diagram. Under these circumstances the circuit for the switch 185 which controls only the scale light is as follows: The circuit passes from the line 202 via the line 245 to the manually operable switch 185, through the line 246 to the switch point 182, to the line 224, through the resistance 177 (and around it if the switch 178 happens to be closed) to the line 225, through the scale light 114 and its telltale light, to the line 226, to the return line 217.

In the manual operation when the switch 185 is open and the switch 186 is closed the circuit passes from the line 202 through the line 245 to the switch 186, to the line 254, through the switch point 181 to the line 255, through the measuring light 105 and its telltale light to the line 256 and back via the return line 217.

If both switches 185 and 186 are closed, the circuit from the line 245 will divide and pass through both switches and thence through the measuring light and the scale light and back to the line 217.

The projection light 140 is controlled by a manually operable switch 251 interposed in the line 250 which with the line 252 connects the projection light and its pilot lamp $L^2$ with the power lines 200 and 207.

It will be seen, from the detailed description given, that I have provided in a compact self-contained machine means for readily mounting and accurately positioning the object, by moving it in any direction and turning it to bring it into the exact position desired for measuring it, and means for thereafter moving the object, and a mechanism to measure any region on the object or a succession of regions and portray a multiple of the measurement on both a visual screen and a light sensitive film. The visual screen is located immediately in front of the operator in his position for initially locating the object and for controlling the various operations within the machine. The controls provide manual switches in a conveniently located instrument board in front of the operator. This instrument board carries also telltale lamps to indicate by their illumination or non-illumination the condition of the lights within the machine.

The light sensitive film may be a roll of paper sensitized for positive indication, or, if desired, it may be a translucent film to produce a negative for subsequent printing. Such terms as "film" and "light sensitive sheet" used herein are intended to include either a positive or negative sensitization irrespective of the specific character of the material carrying the sensitized surface.

The sensitized film may be readily mounted outside of the machine in a light-tight housing which may then be readily placed in the machine. Likewise the printed film in its light-tight housing may be readily removed for development. The machine provides means for severing any portion of the printed film and to form an indicatnig legend on such portion before severance.

The machine operates to produce a line on the sensitized sheet corresponding to the contour of the object in the various regions measured. The machine also provides means for printing a chart of definitely spaced indications on which such line is superimposed, with the result that the number of such indications or the spaces between them in a given row thereof may furnish at once a portrayal of the actual distance between the line and a given datum or between two superimposed lines corresponding to the measurement of opposite sides of the object.

The mechanism provides for making periodic chart indications of a different character from the normal chart indications, as, for instance, a heavier or blacker impression, to aid one in counting the indications of the chart.

It results from the provisions made in the machine that changing measurement in the surface of the object as it is moved with reference to a feeler may be continuously observed on the visual screen and recorded in permanent form on the chart. Furthermore any particular region of an object may be tested immediately to show on the visual screen the cross sectional dimension of that region of the object or the distance of a surface point thereon from a given datum line.

I claim:

1. In a measuring machine, the combination of means for holding an object to be measured, means for holding a light sensitive strip means for moving the object and strip in synchronism, a feeler across which the object moves and which engages said moving object, means controlled by the movement of the feeler for directing light onto the strip while the strip and object are moving thereby producing a line image on the strip, means for directing onto the strip a row of definitely spaced measuring indications from a source of illumination, said row extending transversely of the direction of movement of the strip, and means for periodically interrupting the last-mentioned illumination to interrupt the longitudinal continuity of the measuring indications.

2. In a measuring machine, the combination of means for holding an object to be measured, a movable feeler to engage the object, a post having an axial extension angularly adjustable concentric of the post axis, a mirror having a shank adjustable in said extension, mechanism connecting the feeler with the post for turning the post about an axis consequent upon and in a direction corresponding to the movement of the feeler, a graduated visual screen, and a source of light operatively mounted to project a light ray on said mirror, said screen being positioned to receive the light ray reflected by said mirror.

3. In a measuring machine, the combination of means for holding an object to be measured, means for holding a light sensitive film, a source of illumination, a comb between said source and the film positioned to have light directed through the comb onto the film to produce spaced indications on the film, means for moving the film and object in synchronism continuously, means for establishing and interrupting alternately the illumination through the comb to interrupt the indications on the continuously moving film, thereby producing a chart of spaced rows of interrupted dashes, a movable feeler adapted to engage the object, and mechanism controlled thereby for directing light onto the film to produce a line indication superimposed on a scale consisting of dashes on the chart.

4. In a measuring machine, the combination of means for holding an object to be measured, means for holding a light sensitive strip, a source of illumination, a comb between said source and the strip positioned to cause light directed through the comb onto the strip to produce spaced indications on the strip, means for moving the strip and object in synchronism continuously, means for establishing and interrupting alternately the illumination through the comb to interrupt the indications on the continuously moving strip, a movable feeler adapted to engage the object, a movable mirror, mechanism actuated by the feeler to turn the mirror in correspondence with the movement of the feeler, a second source of illumination, said mirror being adapted to direct light from said second source onto the strip independently of the comb to superimpose an indication on the scale consisting of the spaced indications on the chart made by the first-mentioned light.

5. In a measuring machine, the combination of means for holding an object to be measured, a movable feeler to engage the object, a post having an extension angularly adjustable with reference to the post, mechanism connecting the feeler with the post for turning the post on its axis consequent upon the movement of the feeler, a pair of mirrors carried by the post, a pair of light-receptive indicating members, one of said members being positioned to receive a reflection from one mirror and the other of said members being positioned to receive a reflection from the other mirror.

6. In a measuring machine, the combination of means to engage an object, a rotative member moved by said means, a post carried by said member, an extension on the post settable with reference to the post, a pair of mirrors each provided with a projecting shank, said shanks being mounted respectively in the post and the extension, a pair of light-receptive indicating members, one of said members being positioned to receive a reflection from one mirror and the other of said members being positioned to receive a reflection from the other mirror.

7. In a measuring machine, the combination of means for holding an object to be measured, means for holding a light sensitive film, a source of illumination, a comb between said source and the film position to cause light directed through the comb onto the film to produce spaced indications constituting a scale on the film, means for moving the film and object synchronously and continuously, means for establishing and interrupting alternately the illumination through the comb to interrupt the indications on the continuously moving film, a pair of movable feelers adapted to engage opposite regions of the object, a pair of movable mirrors respectively associated with the feelers, mechanism actuated by each feeler to turn its respective mirror in correspondence with the movement of the feeler, a second source of illumination, said mirrors being adapted to direct a ray of light from said second source onto spaced portions of the film independently of the comb to superimpose a pair of indications on the scale made by the first-mentioned light whereby the spacing of said last-mentioned indications corresponds with the thickness of said object.

8. In a measuring machine, the combination of means for holding an object to be measured, means for holding a light sensitive film, a source of power, electric motors connected thereto for synchronously progressing the object and the film, a feeler adapted to engage the progressing object, a source of light, means controlled by the feeler for directing a ray of light from said source onto the film, a second source of light adapted to direct a light toward said film, means disposed between said second source and the film and having spaced interrupters to cause a scale to be applied to said film by interrupted exposure to light from said second source, said scale being superimposed on the film in registration with the line made by the measurement mechanism during the measurement, circuits interconnecting said light sources and motors with the source of power, control means adapted to render them simultaneously active or inactive as desired, and control means adapted to render said light sources active independent of said motors.

9. In a measuring apparatus having table drive means for a traveling work table and an associated light sensitive film, a control circuit having a source of power, a table drive motor and a film propelling motor connected across said source in synchronous relation, a measuring light circuit and a scale producing light circuit including a plurality of switches and a resistance, one of said switches being operatively associated with the table drive and thereby adapted to close said scale producing light circuit intermittently in a predetermined manner in relation to the table travel, said second switch operatively associated with the table drive to intermittently by-pass said resistor in a predetermined manner at a predetermined frequency lower than that of the intermittent operation of said first switch.

10. In a measuring apparatus having table drive means for a traveling work table and an associated light sensitive film, a control circuit having a source of power, a measuring light circuit and a scale producing light circuit, said scale producing light circuit including a switch operatively associated with the table drive and thereby adapted to intermittently close said scale producing light circuit in a predetermined manner with relation to the table travel, a table drive motor and a film propelling motor, a circuit interconnecting each of said light circuits and said motors across the source of power, said interconnecting circuit including a switch and relay means whereby the closure of said switch is adapted to activate said relay to interconnect the light circuits with the motors and the source of power.

11. In a measuring machine, the combination of means for holding an object to be measured, a pair of feelers adapted to simultaneously engage opposite sides of the object, means holding a film adapted to receive an indication by exposure to light, means for directing light on the film, a pair of mechanisms each associated respectively with one of the feelers and each adapted to vary the direction of light toward the film in accordance with the corresponding feeler movement, power-operated means for synchronously progressing the film relative to the light directed thereon and the object relative to the feeler, said power operated means including a source of electrical energy having an electrical indicating device and a pair of switches connected thereto, each switch being operably positioned for actuation by extreme movements of one of the feelers to disconnect the power-operated means from the source of electrical energy whenever the feeler directed light falls beyond the boundary edges of the film.

References Cited in the file of this patent

UNITED STATES PATENTS

| Number | Name | Date |
|---|---|---|
| 763,011 | Mietaschk | June 21, 1904 |
| 1,205,826 | Wentworth | Nov. 21, 1916 |
| 1,350,769 | Bartlett | Aug. 24, 1920 |
| 1,467,403 | Toomey | Sept. 11, 1923 |
| 1,485,154 | Aldeborgh | Feb. 26, 1924 |

(Other references on following page)

UNITED STATES PATENTS

| Number | Name | Date |
|---|---|---|
| 1,655,386 | Craig | Jan. 3, 1928 |
| 1,823,636 | Winkler | Sept. 15, 1931 |
| 1,927,750 | Mennesson | Sept. 9, 1933 |
| 1,947,280 | Thearle | Feb. 13, 1934 |
| 1,976,337 | Firestone | Oct. 9, 1934 |
| 1,987,811 | Winkley | Jan. 15, 1935 |
| 2,011,931 | Dreyer | Aug. 20, 1935 |
| 2,025,562 | Balsiger | Dec. 24, 1935 |
| 2,136,134 | Holley | Nov. 8, 1938 |
| 2,171,433 | Powers | Aug. 29, 1939 |
| 2,261,093 | Poupitch | Oct. 28, 1941 |
| 2,293,349 | Martin | Aug. 18, 1942 |
| 2,305,264 | Leonard | Dec. 15, 1942 |
| 2,307,950 | Plaut | Jan. 12, 1943 |
| 2,313,133 | Ernst | Mar. 9, 1943 |
| 2,347,160 | Wallace | Apr. 16, 1944 |
| 2,348,401 | Manzanera | May 9, 1944 |
| 2,397,108 | Hanna | Mar. 26, 1946 |
| 2,451,155 | De Boer | Oct. 12, 1948 |
| 2,501,538 | Rusha | Mar. 21, 1950 |

FOREIGN PATENTS

| Number | Country | Date |
|---|---|---|
| 865,954 | France | June 11, 1941 |
| 705,063 | Germany | Apr. 16, 1941 |